(12) United States Patent
Faronius et al.

(10) Patent No.: US 9,622,287 B2
(45) Date of Patent: Apr. 11, 2017

(54) SYSTEM AND METHOD FOR SUPPORTING SWITCHING BETWEEN A PACKET-SWITCHED NETWORK AND A CIRCUIT-SWITCHED NETWORK

(71) Applicant: Telefonaktiebolaget L M Ericsson (publ), Stockholm (SE)

(72) Inventors: Carola Faronius, Järfälla (SE); Walter Müller, Upplands Väsby (SE); Eric Parsons, Stittsville (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/383,729

(22) PCT Filed: Mar. 19, 2013

(86) PCT No.: PCT/SE2013/050304
§ 371 (c)(1),
(2) Date: Sep. 8, 2014

(87) PCT Pub. No.: WO2013/141804
PCT Pub. Date: Sep. 26, 2013

(65) Prior Publication Data
US 2015/0018036 A1    Jan. 15, 2015

Related U.S. Application Data

(60) Provisional application No. 61/649,765, filed on May 21, 2012, provisional application No. 61/614,348, (Continued)

(51) Int. Cl.
*H04B 1/00*        (2006.01)
*H04W 72/04*    (2009.01)
(Continued)

(52) U.S. Cl.
CPC ........ *H04W 76/046* (2013.01); *H04B 1/0053* (2013.01); *H04W 68/12* (2013.01);
(Continued)

(58) Field of Classification Search
CPC ... H04W 76/068; H04W 88/06; H04W 24/00; H04W 24/02; H04W 28/0236;
(Continued)

(56) References Cited

U.S. PATENT DOCUMENTS

| 9,084,262 B2 | 7/2015 | Chin et al. | |
|---|---|---|---|
| 2002/0122401 A1* | 9/2002 | Xiang | H04W 76/026 370/338 |

(Continued)

FOREIGN PATENT DOCUMENTS

| WO | 0167794 A1 | 9/2001 |
|---|---|---|
| WO | 2007050733 A1 | 5/2007 |

(Continued)

OTHER PUBLICATIONS

European Telecommunications Standards Institute, "LTE; Evolved Universal Terrestrial Radio Access (E-UTRA); Medium Access Control (MAC) protocol specification (3GPP TS 36.321 version 10.5.0 Release 10)", Technical Specification, ETSI TS 136 321 V10.5.0, Mar. 1, 2012, pp. 1-56, ETSI.

(Continued)

*Primary Examiner* — Inder Mehra
(74) *Attorney, Agent, or Firm* — Coats & Bennett, PLLC

(57) ABSTRACT

A device and method for controlling communications between a User Equipment (UE) (20) and a base station (BS) (90) in a radio access network (RAN) (16) is provided. The UE (20) indicates to the BS (90) in the RAN (16) that a transceiver at the UE (20) will temporarily suspend communications with the RAN (16). The BS (90) acknowledges the indication from the UE (20) and temporarily suspends (Continued)

communications with the UE (20). Responsive to the acknowledgement from the BS (90), the UE (20) temporarily suspends communications between the transceiver and the RAN (16). The UE (20) then resumes communications between the transceiver and the BS (90) in the RAN (16).

26 Claims, 10 Drawing Sheets

Related U.S. Application Data filed on Mar. 22, 2012, provisional application No. 61/612,935, filed on Mar. 19, 2012.

(51) Int. Cl.
*H04W 76/04* (2009.01)
*H04W 76/02* (2009.01)
*H04W 68/12* (2009.01)
*H04W 88/06* (2009.01)
*H04W 92/10* (2009.01)

(52) U.S. Cl.
CPC ..... *H04W 72/0413* (2013.01); *H04W 76/026* (2013.01); *H04W 76/045* (2013.01); *H04W 88/06* (2013.01); *H04W 92/10* (2013.01)

(58) Field of Classification Search
CPC ......... H04W 28/0268; H04W 28/0278; H04W 36/0022; H04W 4/06; H04W 52/02; H04W 52/0206; H04W 52/0209; H04W 52/0229; H04W 52/0235; H04W 76/046; H04W 76/026; H04W 76/048; H04W 72/0466; H04W 72/14; H04W 76/045; H04W 76/04; H04W 76/043
USPC ....... 370/329, 232, 311, 331, 228, 315, 328, 370/338, 352, 235; 455/422.1, 435.1, 455/552.1, 404.2, 436, 127.1, 433, 435.2, 455/437, 456.5, 574
See application file for complete search history.

(56) References Cited

U.S. PATENT DOCUMENTS

| | | |
|---|---|---|
| 2003/0118136 A1 | 6/2003 | Tiedemann, Jr. et al. |
| 2009/0046667 A1* | 2/2009 | Pelletier .............. H04W 52/286 370/335 |
| 2010/0267339 A1 | 10/2010 | Lin et al. |
| 2011/0059739 A1* | 3/2011 | Huang ................. H04W 48/18 455/435.1 |
| 2011/0092198 A1* | 4/2011 | Miyata .............. H04W 36/0022 455/422.1 |
| 2011/0261763 A1* | 10/2011 | Chun .................. H04W 74/008 370/329 |
| 2012/0020310 A1 | 1/2012 | Ji et al. |
| 2013/0039339 A1* | 2/2013 | Rayavarapu ........ H04W 76/028 370/331 |
| 2013/0242735 A1* | 9/2013 | Koc ...................... H04L 5/1469 370/232 |
| 2013/0242831 A1* | 9/2013 | Vannithamby ........ H04L 5/1469 370/311 |

FOREIGN PATENT DOCUMENTS

| | | | |
|---|---|---|---|
| WO | 2011118997 A2 | 9/2011 | |
| WO | WO2011118997 | * 11/2011 | ............ H04W 76/06 |
| WO | 2013012371 A1 | 1/2013 | |
| WO | 2013140343 A1 | 9/2013 | |

OTHER PUBLICATIONS

Qualcomm Incorporated, "Dynamic activation and de-activation of secondary cells during carrier", 3GPP TSG-RAN WG2 #77, Dresden, Germany, Feb. 6, 2012, pp. 1-4, R2-120306, 3GPP.

3rd Generation Partnership Project, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2(Release 10)", Technical Specification, 3GPP TS 36.300 V10.3.0, Mar. 1, 2011, pp. 1-197, 3GPP, France.

\* cited by examiner

SYSTEM AND METHOD FOR SUPPORTING SWITCHING BETWEEN A PACKET-SWITCHED NETWORK AND A CIRCUIT-SWITCHED NETWORK

RELATED APPLICATIONS

This application claims priority from U.S. Provisional Application Ser. No. 61/612,935 entitled "System and Method for Supporting Switching Between a Packet-Switched Network and a Circuit-Switched Network," filed Mar. 19, 2012, and from U.S. Provisional Application Ser. No. 61/614,348 entitled "System and Method for Supporting Switching Between a Packet-Switched Network and a Circuit-Switched Network," filed Mar. 22, 2012, and from U.S. Provisional Application Ser. No. 61/649,765 entitled "System and Method for Supporting Switching Between a Packet-Switched Network and a Circuit-Switched Network," filed May 21, 2012. Each of the '935, '348, and '765 provisional applications are incorporated herein by reference in their entirety.

FIELD OF THE INVENTION

The present disclosure relates generally to the operation of User Equipment (UE) in a wireless communication network, and more particularly to a system and procedure for controlling communications between a User Equipment (UE) and a base station in a radio access network (RAN).

BACKGROUND

Cellular networks were originally developed to provide primarily voice services over circuit switched (CS) networks. However, the introduction of packet switched (PS) networks enables network operators to provide data services as well as voice services to users. Eventually, network architecture is expected to evolve toward all-IP networks capable of providing both voice and data services.

Currently, some UEs implement functionality that allows them to transition from communicating with a PS network, e.g., via an LTE network, to communicating with a CS network, e.g., via IS95/CDMA network. To accomplish this, the UEs enter an idle mode with respect to the CS network after registering with the CS network, and begin communicating over the PS network. While the UE is in the CS network idle mode, the CS network may provide the UE with services notifications via the PS network. For example, the CS network may alert the UE to an incoming call. Additionally, the UE may autonomously transition from the PS network to the CS network for a short period of time to perform some function associated with the CS network idle mode, or more specifically, some function associated with the Radio Resource Control (RRC) idle mode associated with the RAN that connects the UE to the CS network, such as to read a paging channel or perform a location update procedure. Once the CS operations are complete, the UE returns to the CS network idle mode and transitions back to communicating in the PS network.

Some UEs have two transceivers and can maintain connections to both the CS and PS networks. However, not all UEs can establish and maintain two different connections. Particularly, some UEs have only a single transceiver, and thus, must temporarily "tune out" of one network (e.g., the PS network) to communicate with the other (e.g., the CS network). For a UE, "tuning out" of the PS network can be problematic, particularly if there is data in the downlink buffers. More specifically, a UE would have to tune out of the PS network for up to two seconds to perform a task, and therefore would risk being dropped by the PS network.

SUMMARY

Embodiments of the present disclosure provide a system and method that permits User Equipment (UE) to initiate a "tune out" procedure by signaling the intention to "tune out" to a base station in a Radio Access Network (RAN) connected to a packet switched (PS) network. As used herein, to "tune out" of a network means that a UE temporarily transitions away from communicating with one network to perform some function, such as to communicate signals and/or data with a different network, or to perform some other function that would allow the UE to benefit from such a "tune out." Such functions include, but are not limited to, functions that would allow the UE to reduce its draw on battery resources, for example.

In one embodiment, the present disclosure provides a method for controlling communications between a UE and a base station in a RAN. In this embodiment, the method is performed by the UE and comprises indicating to the base station in the RAN that a transceiver at the UE will temporarily suspend communications with the RAN. The UE then temporarily suspends communications between the transceiver and the RAN. Thereafter, the UE resumes communications between the transceiver and the base station in the RAN.

In another embodiment, the present disclosure provides a UE configured to indicate to the base station in the RAN that a transceiver at the UE will temporarily suspend communications with the RAN. In this embodiment, the UE comprises a communications interface comprising a transceiver configured to communicate with the base station in the RAN and a programmable controller operatively connected to the transceiver. The programmable controller is configured, according to embodiments of the present disclosure, to indicate to the base station in the RAN that the transceiver will temporarily suspend communications with the RAN. The programmable controller is configured to temporarily suspend communications between the transceiver and the RAN. Thereafter, the programmable controller resumes communications between the transceiver and the base station in the RAN.

In another embodiment, the present disclosure provides a method, performed at a base station in a RAN, for controlling communications between a UE and the base station in the RAN. In this embodiment, the base station in the RAN receives an indication from the UE indicating that the UE will temporarily suspend communications with the RAN. Upon receiving the indication, the base station temporarily suspends communications with the UE. Thereafter, the base station will resume communications with the UE.

The present disclosure further provides a base station in a RAN configured to control communications between a UE and the base station. In this embodiment, the base station comprises a communications interface and a programmable controller. The communications interface is configured to communicate with one or more UE devices in the RAN. The programmable controller is operatively coupled to the communications interface, and is configured to receive an indication from a UE indicating that the UE will temporarily suspend communications with the RAN. Upon receiving the indication from the UE, the programmable controller will temporarily suspend communications with the UE. Thereafter, the programmable controller will resume communications with the UE.

Of course, those skilled in the art will appreciate that the present disclosure is not limited to the above contexts or examples, and will recognize additional features and advantages upon reading the following detailed description and upon viewing the accompanying drawings.

DETAILED DESCRIPTION

Embodiments of the present disclosure provide a system and method by which a UE having a single transceiver may indicate its intention to temporarily "tune out" of a PS network, or more specifically, of a RAN connected to a PS network, to perform some desired function. The UE may perform this function, for example, to temporarily transition to a CS network, or more specifically, to a RAN connected to a CS network, to listen to a paging channel or perform a location area update, or to reduce the draw on its battery resources.

Those of ordinary skill in the art should appreciate that, although the present disclosure describes the embodiments in the context of a UE transitioning between a PS network and a CS network, this is merely for illustrative purposes. The methods and procedures described herein are equally applicable to UEs transitioning between an LTE network connected to a PS network and a WFi network connected to a private or public IP network, such as the Internet, for example.

Figure 1:
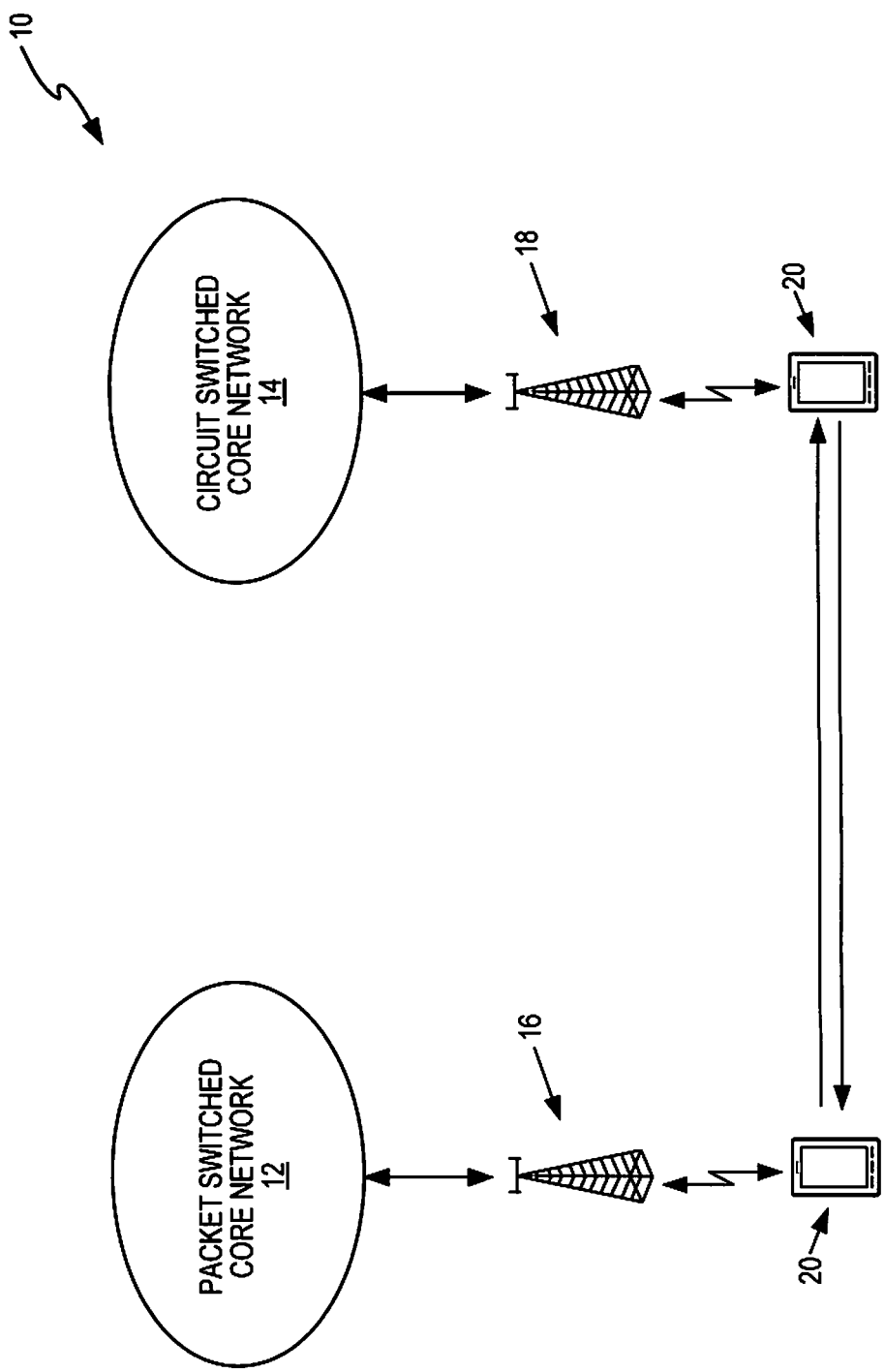
FIG. 1 illustrates a communications system comprising a packet switched (PS) network and a circuit switched (CS) network suitable for use in one embodiment of the present disclosure.

Turning to the drawings, FIG. 1 illustrates a high-level, functional block diagram of a communications system 10. As seen in FIG. 1, system 10 comprises a packet switched core network (PSCN) 12 and a circuit switched core network (CSCN) 14. The PSCN 12 connects to a packet data network (PDN), such as the Internet (not shown), and as is known in the art, communicates signals and data with a User Equipment (UE) 20 via a Radio Access Network (RAN) 16, e.g., the Evolved Universal Terrestrial Radio Access Network or E-UTRAN. The RAN 16 may implement any standards known in the art; however, in one embodiment, the RAN 16 conforms to the Long Term Evolution (LTE) protocol and its extensions defined by the Third Generation Partnership Project (3GPP). As known in the art, the RAN 16 includes one or more base stations referred to as eNodeBs (eNB). Each eNB in the RAN 16 provides wireless communication service to a plurality of UEs, such as UE 20, within a geographical area, or cell.

The CSCN 14 comprises a network that connects to a circuit switched network such as the Public Services Telephone Network (PSTN) (not shown). The CSCN 14 provides primarily voice services and low rate data services to the UE 20 over an air interface via one or more base stations (BS) in a RAN 18. The RAN 18 may also operate according to any known standards. However, in one embodiment, the RAN 18 operates according to the well-known IS95/CDMA standards. Thus, the RAN 16 may operate according to one radio access technology and the RAN 18 may operate according to another radio access technology.

As previously stated, the UE 20 may still receive service notifications from the CSCN 14 relating to circuit switched services. For example, the UE 20 may want to receive paging messages alerting the UE 20 to incoming voice calls. To accomplish this, the UE 20, upon registering with the PSCN 12, requests that the PSCN 12 forwards circuit services notifications to the UE 20 via RAN 16. Thereafter, whenever the PSCN 12 receives a notification (e.g., an incoming call) from the CSCN 14 for the UE 20, the PSCN 12 sends that notification to the UE 20 via the RAN 16. Upon receipt of the notification, the UE 20 transitions to the RAN 18 to communicate with the CSCN 14, and returns back to the PSCN 12 and RAN 16 when complete.

Additionally or alternatively, the UE 20 may also need to autonomously transition to the CSCN 14 from time to time to perform some scheduled function, such as read a paging channel or perform a location services update, for example. In these cases, the UE 20 must "tune out" of the PSCN 12 and temporarily transition to communicating with the CSCN 14 via RAN 18 to perform the function. However, the UE 20 is currently not required to notify the PSCN 12 when it will transition to the CSCN 14. As stated above, such procedures can be problematic because they may cause unexpected behavior in the RAN 16 and/or the PSCN 12 networks.

For example, when a downlink buffer has data for UE 20, the PSCN 12 will attempt to send that data to the UE 20 via the RAN 16 at its scheduled time. However, the RAN 16 cannot deliver that data over the air interface if the UE 20 is currently connected to another network. In most cases, the attempts to send the data to the UE 20 while the UE 20 is connected to another network are a waste of network resources. However, in some cases, it could result in dropped calls for the UE 20. Some UEs are capable of establishing and maintaining multiple connections, and as such, may not be adversely affected. Other UEs, such as those having only a single transceiver, for example, would be adversely affected by the need to periodically or autonomously "tune out" of the RAN 16, and thus, also out of the PSCN 12 to communicate with the CSCN 14.

Therefore, according to embodiments of the present disclosure, a UE such as UE 20, first indicates to a base station, e.g., an eNB, in the RAN 16 that the UE 20 requests to temporarily "tune out" for some period of time. Once the request is sent, and the UE 20 receives an acknowledgement, the UE 20 may transition from communicating with the RAN 16 and PSCN 12 to communicating with the RAN 18 and CSCN 14. By way of example, the UE 20 may transition to read a paging channel or to perform a location update procedure. Regardless of the reason for the transition, however, the base station, e.g., the eNB, in RAN 16 will temporarily suspend communicating data with the UE 20. Once the UE 20 transitions back to the PSCN 12 and notifies its presence to RAN 16, e.g., by sending an uplink (UL) scheduling request or random access request, the base station, e.g., the eNB, in RAN 16 resumes normal operations with the UE 20.

Figure 2:
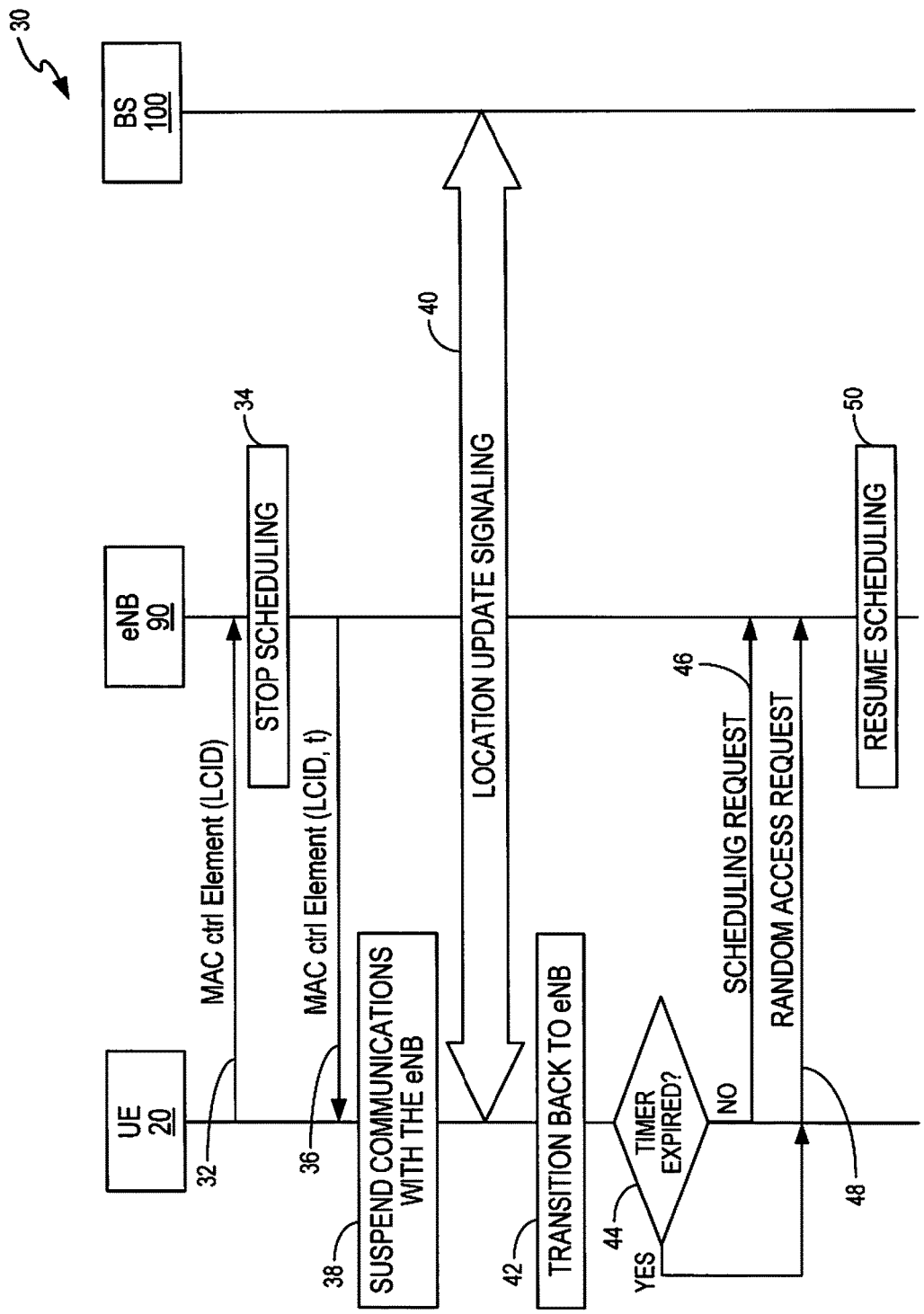
FIG. 2 is a call flow diagram illustrating a UE initiated tune out procedure according to one embodiment of the present disclosure.

FIG. 2 is a signal diagram illustrating a method 30 of supporting such a transition by the UE 20 from the PSCN 12 to the CSCN 14 and back again. As seen in FIG. 2, the UE 20 first sends a Media Access Control (MAC) Control Element to the base station, e.g., eNB 90, in RAN 16 to indicate the intention to temporarily tune out of RAN 16 and the PSCN 12 (line 32). The MAC Control Element is sent via the uplink shared channel (UL-SCH), and includes, for example, information that identifies the UE 20, as well as the Logical Channel Identifier (LCID). Additionally, the MAC Control Element may also include an indication of whether the requested tune out is a "one time" tune out, or whether the UE 20 will periodically tune out of the RAN 16 and PSCN 12. Upon receipt of a "tune out" request or indication message, i.e., the MAC Control Element, the base station, e.g., the eNB 90, performs the actions necessary to avoid radio link failure and/or dropped calls for the UE 20. This may include, for example, temporarily stopping the scheduling of the data for the UE 20 (box 34), but may also include determining when the UE 20 is permitted to tune out, for how long the UE 20 is permitted to tune out, and/or whether the UE 20 is permitted to execute a one-time tune out, or whether the UE 20 is permitted to perform periodic tune outs from the RAN 16 and PSCN 12.

The base station, e.g., eNB 90, then sends an acknowledgement to the UE 20 (line 36). The acknowledgment may comprise a MAC Control Element having the LCID as well as a time t that indicates when the UE 20 is permitted to tune out of the RAN 16 and PSCN 12. In some embodiments, the time t may be an absolute time, however, in other embodiments, the time t is an elapsed time relative to some event, such as the receipt at the UE 20 of the MAC Control Element from the base station, e.g., eNB 90. The UE 20 then suspends communications (box 38) with the base station, e.g., eNB 90, and transitions from the RAN 16 and PSCN 12 to communicate with the CSCN 14 via a BS 100 in RAN 18 (line 40). As previously stated, the UE 20 may perform a location update function, read a paging channel, or perform some other function associated with the CSCN 14.

Upon transitioning back to the RAN 16 and PSCN 12 (box 42), the UE 20 will send a scheduling request (SR) to the base station, e.g., eNB 90, via the Physical Uplink Control Channel (PUCCH) (line 46). However, if the out-of-sync timer at the RAN 16 expires before the UE 20 transitions back to the RAN 16 and PSCN 12 (box 44), the UE 20 will send a random access request to the base station, e.g., eNB 90 (line 48). The base station, e.g., eNB 90, may then resume scheduling and normal operations with the UE 20 (box 50) once the base station, e.g., eNB 90, has received a transmission on the uplink with CRC OK, or when the eNB 90 implicitly, based on timers, starts scheduling grants or transmissions to the UE 20 and receives the appropriate feedback or response messages from UE 20.

Figure 3:
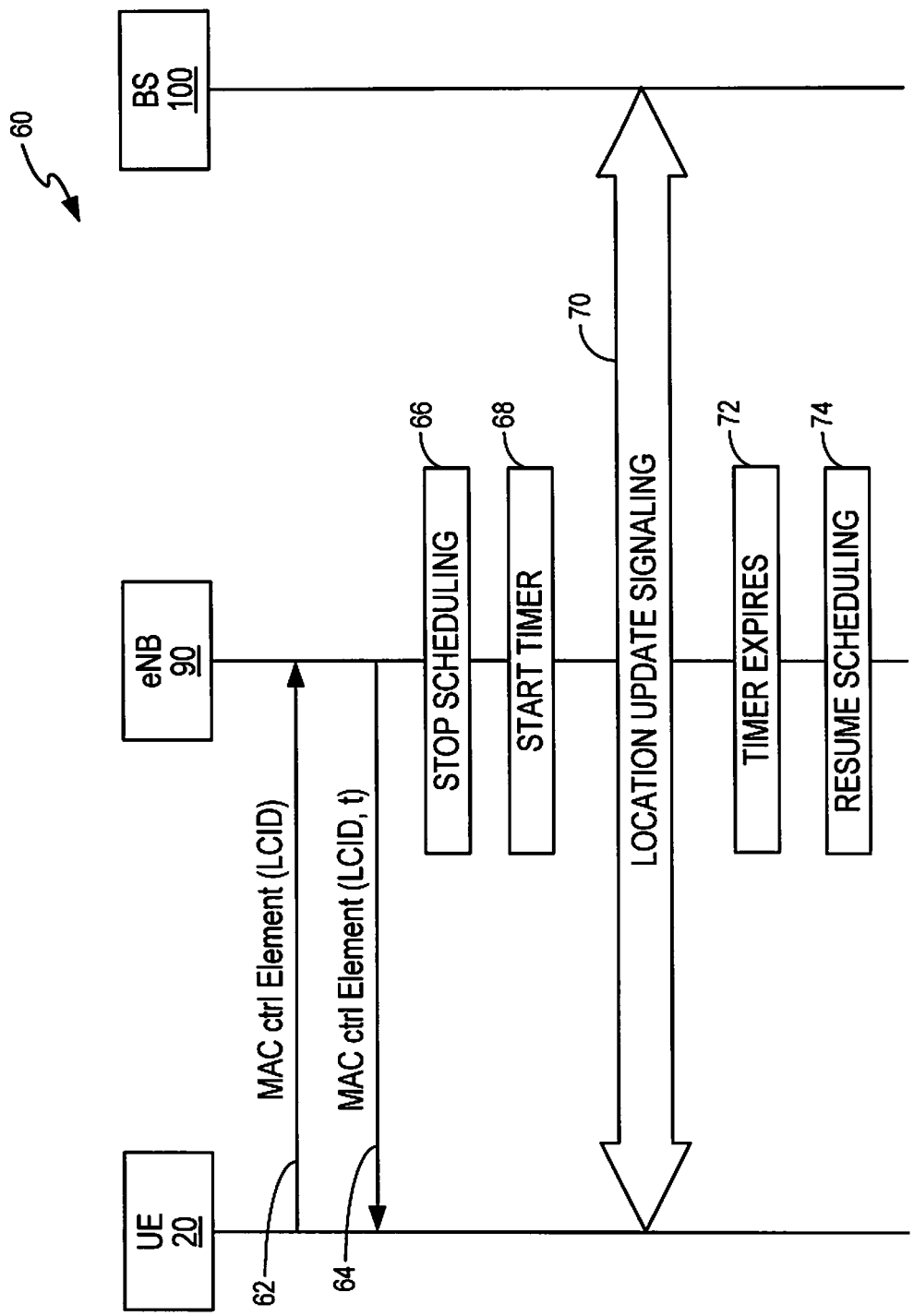
FIG. 3 is a call flow diagram illustrating a UE initiated tune out procedure according to another embodiment of the present disclosure.

FIG. 3 is a signal diagram illustrating a method 60 of supporting the temporary transition of the UE 20 from the RAN 16 and PSCN 12 to the RAN 18 and CSCN 14 according to another embodiment of the present disclosure. As seen in FIG. 3, the UE 20 first indicates the intention to tune out of the RAN 16/PSCN 12 (line 62) and receives the acknowledgment from the base station, e.g., eNB 90, (line 64), as previously described. The base station, e.g., eNB 90, then stops scheduling and/or performs other functions as necessary to avoid dropping calls and radio link failure (box 66). The base station, e.g., eNB 90, then starts a timer (box 68) for some predetermined period of time. While the timer is running, the scheduling and other functions related to supporting the communications between the UE 20 and the RAN 16/PSCN 12 remains suspended. During this time, the UE 20 may communicate with the CSCN 14 via BS 100, as previously stated (line 70). However, when the timer expires (box 72), the base station, e.g., eNB 90, performs the functions needed to resume scheduling and normal operations with the UE 20 (box 74).

It should be noted that, although the previous embodiments describe the present disclosure in the context of temporary transitions from the RAN 16/PSCN 12 to the RAN 18/CSCN 14, the present disclosure is not so limited. In other embodiments, the UE 20 may send the MAC Control Elements to the base station or eNB 90, as previously described, to effect battery savings. For example, the UE 20 may send the MAC Control Elements to request permission from the base station, e.g., eNB 90 to immediately enter a long cycle, or more specifically, a long Discontinuous Reception (DRX) cycle. During these times, the UE 20 might only awake during the long cycle, or long DRX cycle, on duration. Alternatively, or additionally, the UE 20 may seek more aggressive power savings by sending the MAC Control Element to the base station, e.g., eNB 90, to request a tune out for a maximum time period. The maximum tune out period may be any length of time desired, but in one embodiment, the maximum length of time that the UE can be granted is signaled to the UE 20 from the base station or eNB 90 using Radio Resource Control (RRC) signaling.

Figure 4:
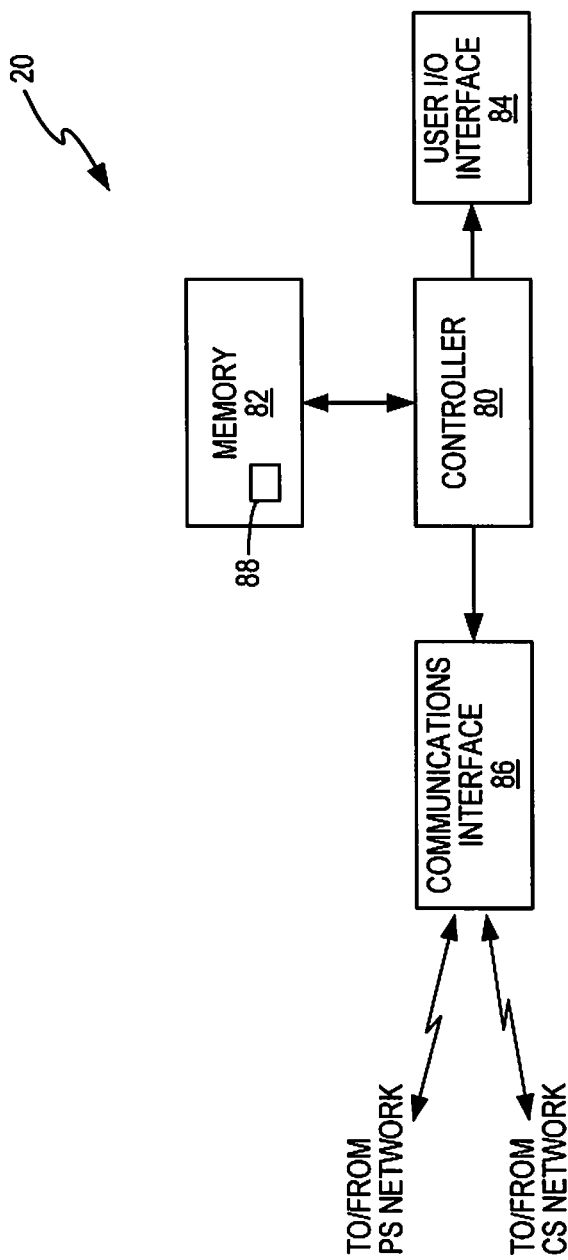
FIG. 4 is a block diagram illustrating some components of a UE configured to initiate a tune out procedure according to one embodiment of the present disclosure.

FIG. 4 is a block diagram illustrating some components of an exemplary UE 20 configured to operate according to one or more embodiments of the present disclosure. As seen in FIG. 4, UE 20 comprises a programmable controller 80, a memory 82, a user I/O interface 84, and a communications interface 86. The user I/O interface 84 provides the components necessary for a user to interact with the UE 20. The communications interface 86 comprises a transceiver that facilitates the communications with the RANS 16, 18, over the respective air interfaces. The memory 82 may comprise any solid state memory or computer readable media known in the art. Suitable examples of such media include, but are not limited to, Read Only Memory (ROM), Dynamic Random Access Memory (DRAM), Flash, or a device capable of reading computer-readable media, such as optical or magnetic media.

The programmable controller 80 may be implemented by one or more microprocessors, hardware, firmware, or a combination thereof, and generally controls the operation of the UE 20 according to the appropriate standards or radio access technologies, for example for both the LTE-based RAN 16 and the IS95/CDMA-based RAN 18. Such functions include, but are not limited to, communicating with the base station or eNB 90 to indicate the intention to temporarily "tune out" of the RAN 16/PSCN 12, as well as to indicate its return, as previously described in this application. In this regard, the programmable controller 80 may be configured to implement logic and instructions 88 to perform the methods of the embodiments of the present disclosure.

Figure 5:
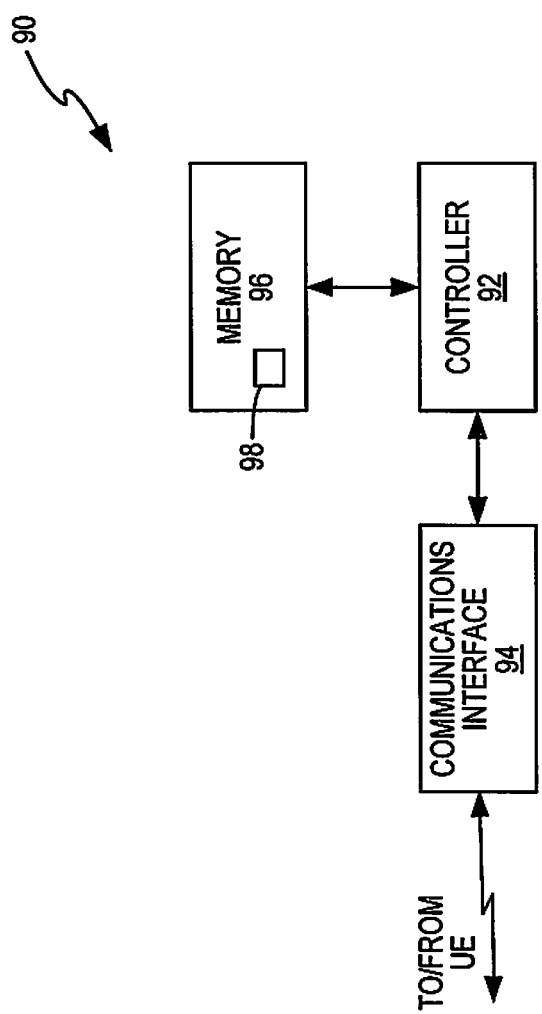
FIG. 5 is a block diagram illustrating some components of a base station configured to operate according to one embodiment of the present disclosure.

FIG. 5 illustrates an exemplary base station or eNB 90 according to one embodiment of the present disclosure. As shown in FIG. 5, the base station or eNB 90 comprises a programmable controller 92, a communications interface 94, and a memory 96. The communications interface 94 may, for example, comprise a transmitter and receiver configured to operate in an LTE system or other similar system. As is known in the art, the transmitter and receiver are coupled to one or more antennas (not shown) and communicate with the UE 20 over the LTE-based air interface. Memory 96 may comprise any solid state memory or computer readable media known in the art. Suitable examples of such media include, but are not limited to, Read Only Memory (ROM), Dynamic Random Access Memory (DRAM), Flash, or a device capable of reading computer-readable media, such as optical or magnetic media.

The programmable controller 92 controls the operation of the base station or eNB 90 in accordance with the LTE standard. The functions of the controller 92 may be implemented by one or more microprocessors, hardware, firmware, or a combination thereof, and include performing the functions to grant and support the temporary tune outs requested by the UE 20. Thus, the controller 92 may be configured to according to logic and instructions 98 stored in memory 96 to communicate the MAC Control Elements with the UE 20, as well as to suspend scheduling and other functions regarding the UE 20 to avoid radio link failure and dropped calls while the UE 20 is tuned out of the RAN 16/PSCN 12.

FIGS. 6A-6D are flow diagrams illustrating methods 110, 120, 130, and 140, respectively, for controlling communications between the UE 20 and a base station such as eNB 90 in RAN 16. The methods 110, 120, 130, and 140 are all performed at the UE 20 by the programmable controller 80.

Figure 6A:
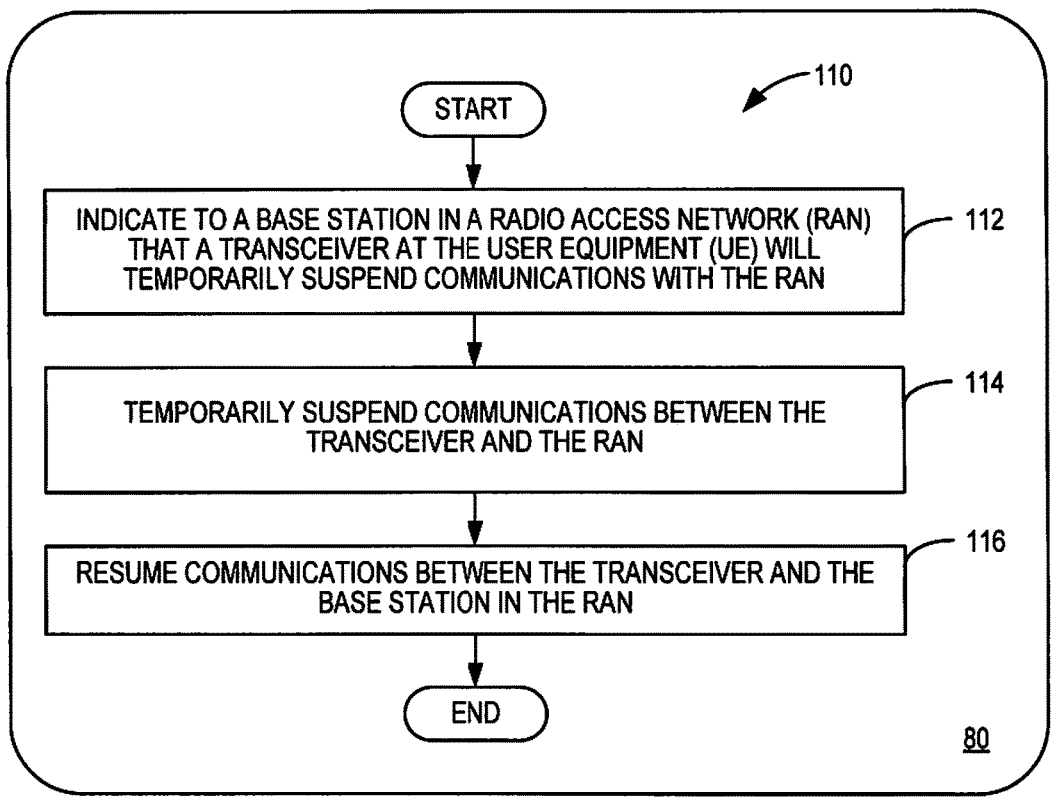
FIGS. 6A-6D are flow diagrams illustrating methods for performing embodiments of the present disclosure by a programmable controller at a UE.

FIG. 6A is a flow diagram illustrating a method 110 according to one embodiment wherein the UE 20 temporarily suspends communications between a transceiver of the UE 20 and the RAN 16. Method 110 begins with the controller 80 at the UE 20 indicating to the base station, e.g., eNB 90, in RAN 16 that a transceiver of communications interface 86 at the UE 20 will temporarily suspend communications with the RAN 16 (box 112). The controller 80 temporarily suspends communications between the transceiver and the RAN 16 (box 114). In some embodiments, the controller 80 may temporarily suspend communications between the transceiver and the RAN 16 responsive to receiving an acknowledgment of the indication from the base station, e.g., eNB 90. While communications are suspended, the UE 20 may perform some other function; however, once finished, the controller 80 at the UE 20 resumes communications between the transceiver of communications interface 86 and the base station, e.g., eNB 90, in the RAN (box 116).

Figure 6B:
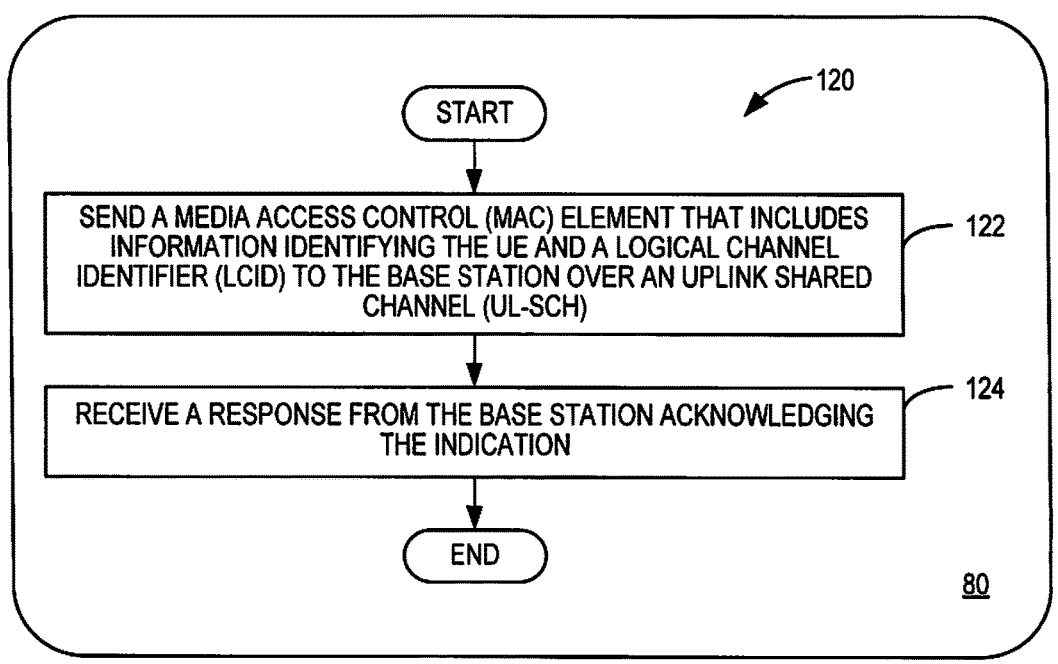

FIG. 6B is a flow diagram illustrating a method 120 according to one embodiment wherein the UE 20 indicates the intention to temporarily suspend communications with the base station, e.g., eNB 90, in the RAN 16. In this embodiment, the controller 80 sends a Media Access Control (MAC) element to the base station, e.g., eNB 90, in RAN 16 over an uplink shared channel (UL-SCH) (box 122). In one embodiment, the MAC element includes information identifying the UE 20 as well as a logical channel identifier (LCID). In another embodiment, however, the MAC element further includes information specifying whether the indication to temporarily suspend communications is a one-time temporary suspension, or whether the UE 20 will periodically temporarily suspend communications with the RAN 16. Once indicated, as stated previously, the controller 80 at the UE 20 receives a response from the base station, e.g., eNB 90, at the RAN 16 acknowledging the indication (box 124). In one embodiment, the response from the base station acknowledging the indication comprises a MAC element including the LCID, and a time indicating when the UE 20 is permitted to temporarily suspend communications with the RAN 16.

Figure 6C:
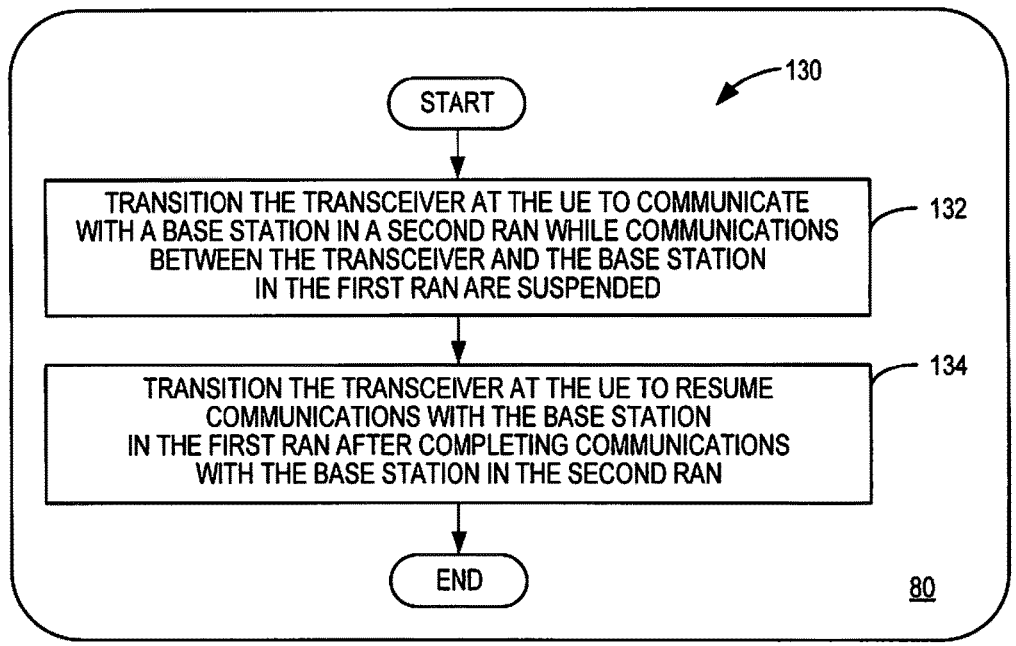

FIG. 6C is a flow diagram illustrating a method 130 wherein the UE 20 transitions the transceiver of communications interface 86 between RANs 16, 18 when temporarily suspending communications with the base station, e.g., eNB 90, in the RAN 16. Method 130 begins with the controller 80 at the UE 20 transitioning the transceiver of communications interface 86 at the UE 20 to communicate with a base station 100 in RAN 18, while communications between the transceiver of communications interface 86 and the base station, e.g., eNB 90, in RAN 16 are suspended (box 132). Once communications with the base station 100 in RAN 18 are finished, the controller 80 transitions the transceiver of communications interface 86 at the UE 20 back to the base station, e.g., eNB 90, in RAN 16 to resume communications with the base station, e.g., eNB 90, in RAN 16 (box 134).

Figure 6D:
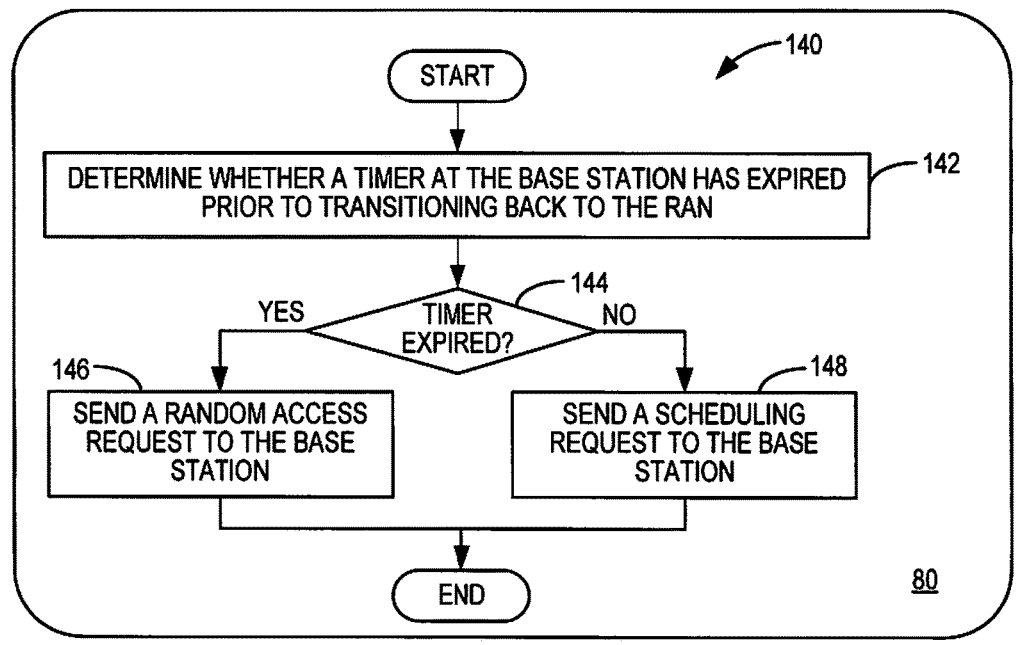

FIG. 6D is a flow diagram illustrating a method 140 wherein the controller 80 at UE 20 resumes communications between the transceiver of communications interface 86 and the base station, e.g., eNB 90, in RAN 16 according to one embodiment. As seen in FIG. 6D, method 140 begins with the controller 80 at the UE 20 determining whether a timer at the base station, e.g., eNB 90, has expired prior to transitioning back to the RAN 16 (box 142). If the timer has expired (box 144), the controller 80 sends a Random Access Request to the base station, e.g., eNB 90, in RAN 16 (box 146). If, however, the timer has not expired (box 144), the controller 80 sends a Scheduling Request to the base station, e.g., eNB 90, (box 148).

Figure 7A:
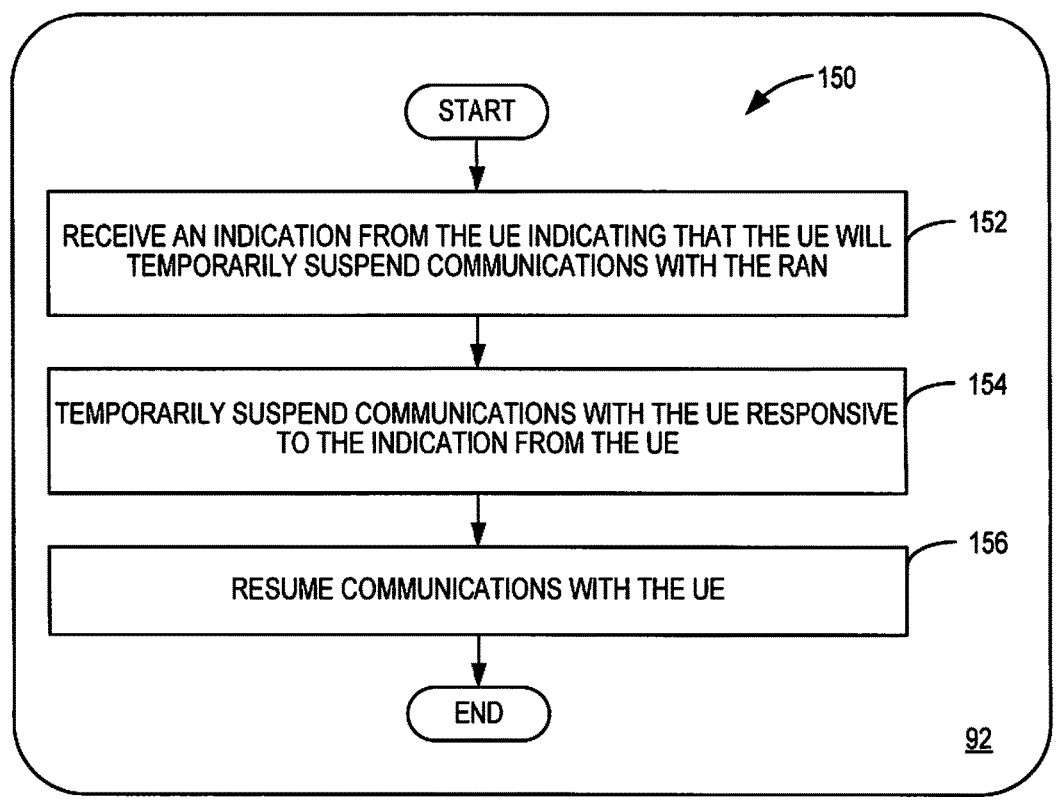
FIGS. 7A-7C are flow diagrams illustrating methods for performing embodiments of the present disclosure by a programmable controller at a base station in a Radio Access Network (RAN).
Figure 7B:
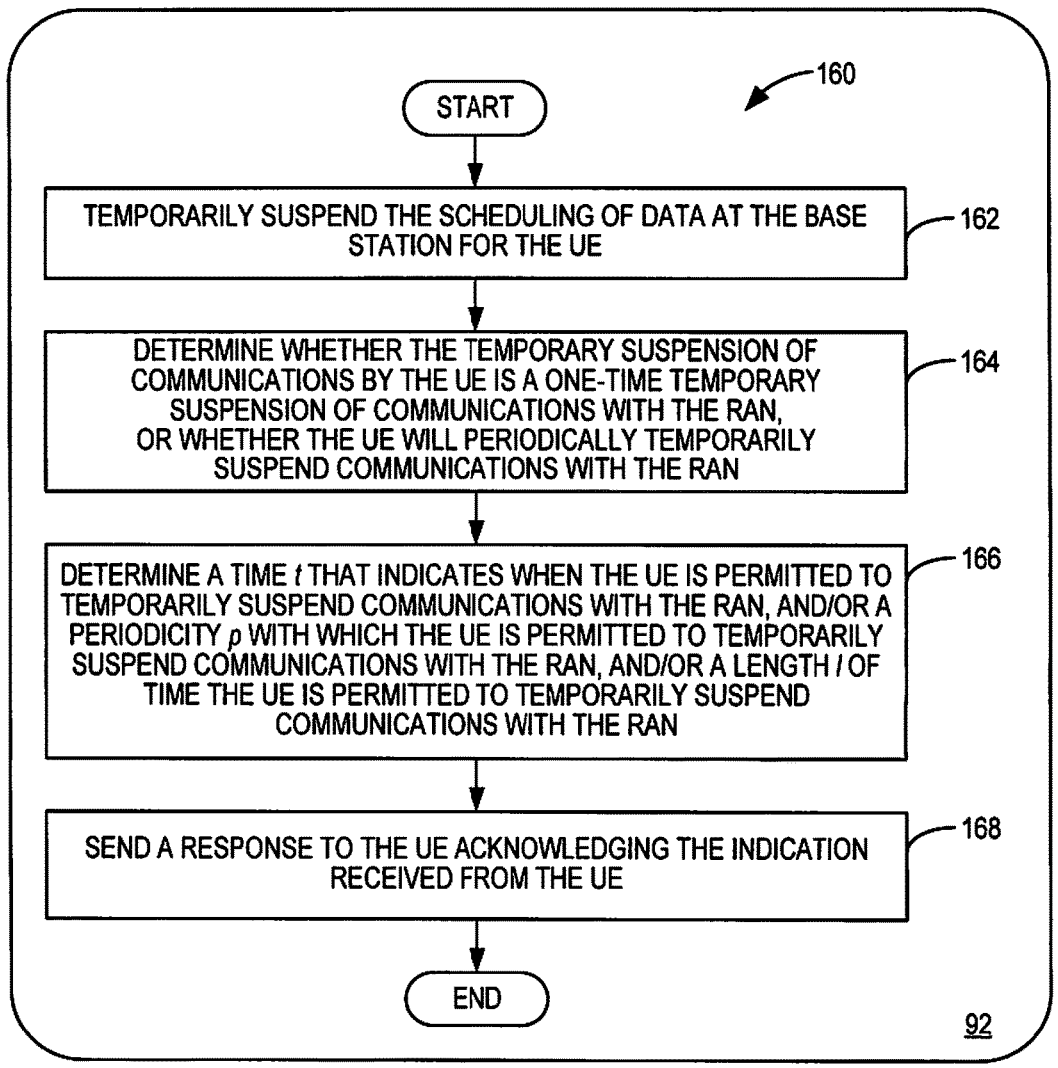
Figure 7C:
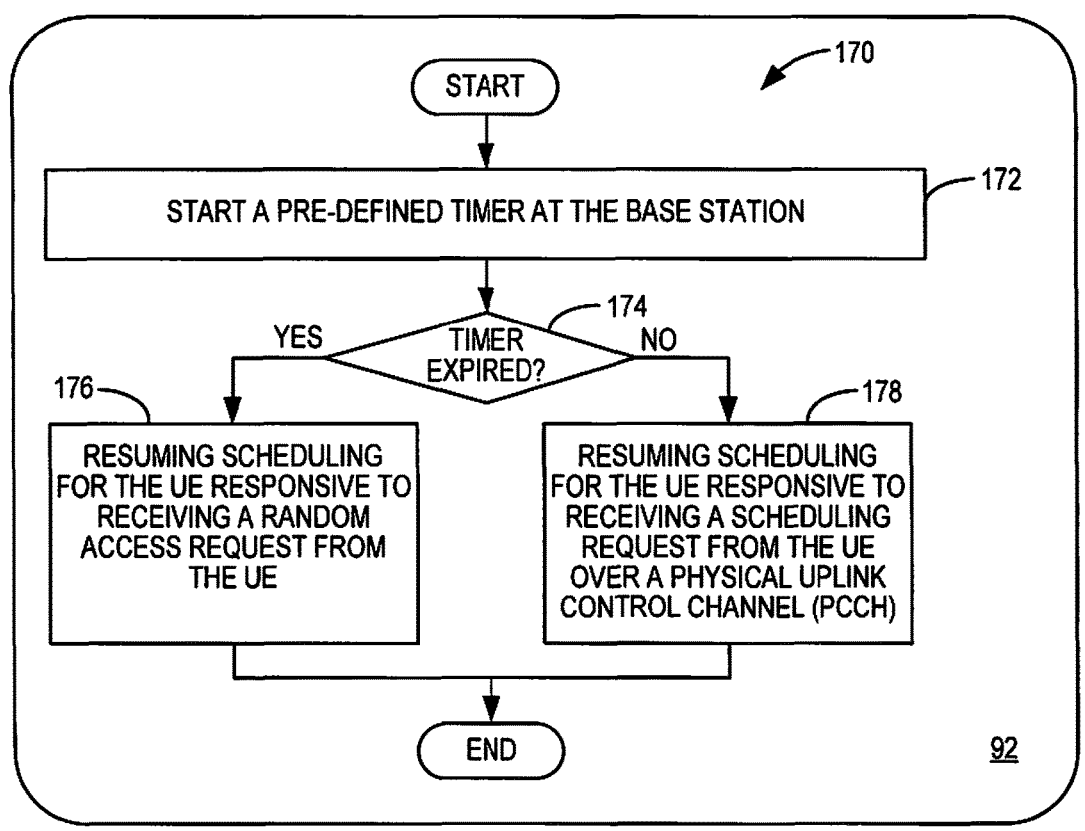

FIGS. 7A-7C are flow diagrams illustrating methods 150, 160, and 170, respectively, for controlling communications between the UE 20 and a base station, e.g., eNB 90, in RAN 16. The methods 150, 160, and 170 are all performed at the base station, e.g., eNB 90, in RAN 16 by the programmable controller 92.

FIG. 7A is a flow diagram illustrating a method 150 wherein the controller 92 of base station, e.g., eNB 90, in RAN 16 temporarily suspends communications with a transceiver at the UE 20. Method 150 begins with the programmable controller 92 at the base station, e.g., eNB 90, receiving an indication from the UE 20 indicating that the UE 20 will temporarily suspend communications with the RAN 16 (box 152). In one embodiment, the indication is received from the UE 20 over a UL-SCH and comprises a MAC element. In response to receiving the indication from the UE 20, the controller 92 at the base station, e.g., eNB 90, temporarily suspends communications with the UE (box 154). Thereafter, the controller 92 at the base station, e.g., eNB 90, will resume communications with the transceiver of communications interface 86 at the UE 20 (box 156).

FIG. 7B is a flow diagram illustrating a method 160 wherein the controller 92 acknowledges the indication received from the UE 20. Particularly, upon receiving the indication from the UE 20, controller 92 temporarily suspends the scheduling of data for the UE 20 (box 162). Then, controller 92 determines whether the temporary suspension of communications by the UE 20 is a one-time temporary suspension of communications with the RAN 16, or whether the UE 20 will periodically temporarily suspend communications with the RAN 16 (box 164). Additionally or alternatively, controller 92, in one embodiment, is further configured to determine a time t that indicates when the UE 20 is permitted to temporarily suspend communications with the RAN 16, and/or a periodicity p with which the UE 20 is permitted to temporarily suspend communications with the RAN 16, and/or a length l of time the UE 20 is permitted to temporarily suspend communications with the RAN 16 (box 166). Once controller 92 has determined this information, controller 92 sends the response to the UE 20 acknowledging the indication received from the UE 20 (box 168). In at least one embodiment, the response sent by controller 92 at the base station includes information identifying one or more of the time t, the periodicity p, and the length l of time.

FIG. 7C is a flow diagram illustrating the processing performed by the controller 92 at base station, e.g., eNB 90, to resume communications with the UE 20. In this embodiment, method 170 begins with the controller 92 at base station in RAN 16 starting a pre-defined timer (box 172). The timer may be set to expire at any time needed or desired. If the timer expires prior to the UE 20 transitioning back to communicate with the RAN 16 (box 174), controller 92 at the base station, e.g., eNB 90, resumes scheduling for the UE 20 responsive to receiving a random access request from the UE 20 (box 176). Otherwise, if the timer does not expire prior to the UE 20 transitioning back to communicate with the RAN 16, the controller 92 resumes scheduling for the UE 20 responsive to receiving a Scheduling Request from the UE 20 over the PCCH (box 178).

The present disclosure may, of course, be carried out in other ways than those specifically set forth herein without departing from essential characteristics of the disclosure. Therefore, the present embodiments are to be considered in all respects as illustrative and not restrictive, and all changes coming within the meaning and equivalency range of the appended claims are intended to be embraced therein.

We claim:

1. A method for controlling communications between a User Equipment (UE) and a base station in a radio access network (RAN), the method performed by the UE and comprising:
   indicating to the base station that a transceiver at the UE will temporarily suspend communications with the RAN by sending a Media Access Control (MAC) element to the base station over an uplink shared channel (UL-SCH);
   temporarily suspending communications between the transceiver and the RAN responsive to receiving a response from the base station acknowledging the indication; and
   resuming communications between the transceiver and the base station in the RAN, wherein the UE sends a Random Access Request or a Scheduling Request to the base station when resuming communications between the transceiver and the base station.

2. The method of claim 1, wherein the MAC element includes information identifying the UE and a logical channel identifier (LCID).

3. The method of claim 2, wherein the MAC element further includes information specifying whether the indication to temporarily suspend communications is a one-time temporary suspension, or whether the UE will periodically temporarily suspend communications with the RAN.

4. The method of claim 2, wherein the response from the base station acknowledging the indication comprises a MAC element including the LCID and a time indicating when the UE is permitted to temporarily suspend communications with the RAN.

5. The method of claim 1, wherein resuming communications between the transceiver and the base station in the RAN comprises:
   determining whether a timer at the base station has expired prior to transitioning back to the RAN; and
   sending either:
   the Random Access Request to the base station if the timer has expired; or
   the Scheduling Request to the base station if the timer has not expired.

6. The method of claim 1, wherein the RAN is a first RAN, the method further comprising:
   transitioning the transceiver at the UE to communicate with a base station in a second RAN while communications between the transceiver and the base station in the first RAN are suspended; and
   transitioning the transceiver at the UE to resume communications with the base station in the first RAN after completing communications with the base station in the second RAN.

7. The method of claim 6, wherein:
   the first RAN is connected to one of a packet-switched network and a circuit-switched network;
   the second RAN is connected to the other of the packet-switched network and the circuit-switched network.

8. The method of claim 1:
   wherein the response from the base station acknowledging the indication comprises information identifying one or more of:
   a time t that indicates when the UE is permitted to temporarily suspend communications with the RAN;
   a periodicity p with which the UE is permitted to temporarily suspend communications with the RAN; and
   a length l of time the UE is permitted to temporarily suspend communications with the RAN; and
   wherein resuming communications between the transceiver and the base station in the RAN comprises resuming the communications in accordance with the information in the response received from the base station.

9. A User Equipment (UE), comprising:
   a communications interface comprising a transceiver configured to communicate with a base station in a radio access network (RAN); and
   a programmable controller circuit operatively connected to the transceiver and configured to:
   indicate to the base station that the transceiver will temporarily suspend communications with the RAN by sending a Media Access Control (MAC) element to the base station over an uplink shared channel (UL-SCH);
   temporarily suspend communications between the transceiver and the RAN responsive to receiving a response from the base station acknowledging the indication; and
   resume communications between the transceiver and the base station in the RAN, wherein the UE is configured to send a Random Access Request or a Scheduling Request to the base station when resuming communications between the transceiver and the base station.

10. The UE of claim 9, wherein the MAC element includes information identifying the UE and a logical channel identifier (LCID).

11. The UE of claim 10, wherein the MAC element specifies whether the temporary suspension of communications is a one-time temporary suspension, or whether the UE will periodically temporarily suspend communications between the transceiver and the RAN.

12. The UE of claim 10, wherein the response from the base station acknowledging the indication comprises a MAC element including the LCID and a time indicating when the UE is permitted to temporarily suspend communications with the RAN.

13. The UE of claim 9, wherein to resume communications between the transceiver and the base station in the RAN, the programmable controller circuit is configured to:
determine whether a timer at the base station has expired prior to transitioning back to the RAN; and
send either:
the Random Access Request to the base station if the timer has expired; or
the Scheduling Request to the base station if the timer has not expired.

14. The UE of claim 9, wherein the RAN is a first RAN, and wherein the programmable controller circuit is further configured to:
transition the transceiver to communicate with a base station in a second RAN while communications between the transceiver and the base station in the first RAN are suspended; and
transition the transceiver at the UE to resume communications with the base station in the first RAN after completing communications with the base station in the second RAN.

15. The UE of claim 14, wherein the first RAN is connected to one of a packet-switched network and a circuit-switched network, and wherein the second RAN is connected to the other of the packet-switched network and the circuit-switched network.

16. The UE of claim 9:
wherein the response from the base station acknowledging the indication comprises information identifying one or more of:
a time t that indicates when the UE is permitted to temporarily suspend communications with the RAN;
a periodicity p with which the UE is permitted to temporarily suspend communications with the RAN; and
a length l of time the UE is permitted to temporarily suspend communications with the RAN; and
wherein the programmable controller is configured to resume the communications between the transceiver and the base station in the RAN in accordance with the information in the response received from the base station.

17. A method for controlling communications between a User Equipment (UE) and a base station in a radio access network (RAN), the method performed by the base station and comprising:
receiving an indication from the UE indicating that the UE will temporarily suspend communications with the RAN, wherein the indication that the UE will temporarily suspend communications with the RAN comprises a Media Access Control (MAC) element received from the UE over an uplink shared channel (UL-SCH);
sending a response to the UE acknowledging the indication received from the UE;
temporarily suspending communications with the UE responsive to receiving the indication from the UE; and
resuming communications with the UE, wherein the base station resumes communications with the UE after receiving a Random Access Request or a Scheduling Request from the UE when the UE resumes communications between the transceiver and the base station.

18. The method of claim 17, wherein temporarily suspending communications with the UE comprises temporarily suspending scheduling of data at the base station for the UE.

19. The method of claim 17, further comprising determining whether the temporary suspension of communications by the UE is a one-time temporary suspension of communications with the RAN, or whether the UE will periodically temporarily suspend communications with the RAN.

20. The method of claim 19:
further comprising determining one or more of:
a time t that indicates when the UE is permitted to temporarily suspend communications with the RAN;
a periodicity p with which the UE is permitted to temporarily suspend communications with the RAN; and
a length l of time the UE is permitted to temporarily suspend communications with the RAN; and
wherein the response includes information identifying one or more of the time t, the periodicity p, and the length l of time.

21. The method of claim 17, wherein resuming communications with the UE comprises:
starting a pre-defined timer at the base station; and
resuming scheduling for the UE responsive to receiving either:
the Scheduling Request from the UE over a Physical Uplink Control Channel (PCCH) if the pre-defined timer does not expire prior to the UE transitioning back to communicate with the RAN; or
the Random Access Request from the UE if the pre-defined timer expires prior to the UE transitioning back to communicate with the RAN.

22. A base station, comprising:
a communications interface configured to communicate with one or more User Equipment (UE) devices in a radio access network (RAN); and
a programmable controller circuit configured to:
receive an indication from a UE indicating that the UE will temporarily suspend communications with the RAN, wherein the indication that the UE will temporarily suspend communications with the RAN comprises a Media Access Control (MAC) element received from the UE over an uplink shared channel (UL-SCH);
send a response to the UE acknowledging the indication received from the UE;
temporarily suspend communications with the UE responsive to receiving the indication from the UE; and
resume communications with the UE, wherein the base station is configured to resume communications with the UE after receiving a Random Access Request or a Scheduling Request from the UE when the UE resumes communications between the transceiver and the base station.

23. The base station of claim 22, wherein the programmable controller circuit is configured to temporarily suspend communications with the UE by to temporarily suspending scheduling of data for the UE.

24. The base station of claim 22, wherein the programmable controller circuit is further configured to determine whether the temporary suspension of communications by the UE is a one-time temporary suspension of communications with the RAN, or whether the UE will periodically temporarily suspend the communications with the RAN.

25. The base station of claim 24:
wherein the programmable controller circuit is further configured to determine one or more of:
a time t that indicates when the UE is permitted to temporarily suspend communications with the RAN;
a periodicity p with which the UE is permitted to temporarily suspend communications with the RAN; and
a length l of time the UE is permitted to temporarily suspend communications with the RAN; and
wherein the response acknowledging the indication received from the UE includes information identifying one or more of the time t, the periodicity p, and the length l of time.

26. The base station of claim 22, wherein to resume communications with the UE, the programmable controller circuit is configured to:
start a pre-defined timer at the base station; and
resume scheduling for the UE responsive to receiving either:
the Scheduling Request from the UE over a Physical Uplink Control Channel (PCCH) if the pre-defined timer does not expire prior to the UE transitioning back to communicate with the RAN; or
the Random Access Request from the UE if the pre-defined timer expires prior to the UE transitioning back to communicate with the RAN.

* * * * *

UNITED STATES PATENT AND TRADEMARK OFFICE
CERTIFICATE OF CORRECTION

PATENT NO. : 9,622,287 B2
APPLICATION NO. : 14/383729
DATED : April 11, 2017
INVENTOR(S) : Faronius et al.

Page 1 of 1

It is certified that error appears in the above-identified patent and that said Letters Patent is hereby corrected as shown below:

In the Specification

In Column 3, Line 54, delete "WFi" and insert -- WiFi --, therefor.

Signed and Sealed this
Twelfth Day of May, 2020

Andrei Iancu
*Director of the United States Patent and Trademark Office*